(12) United States Patent
Hessling-Von Heimendahl et al.

(10) Patent No.: US 10,611,480 B2
(45) Date of Patent: Apr. 7, 2020

(54) AIRCRAFT OVERHEAD PASSENGER SERVICE UNIT

(71) Applicant: Goodrich Lighting Systems GmbH, Lippstadt (DE)

(72) Inventors: Andre Hessling-Von Heimendahl, Koblenz (DE); Stefan Becker, Lippstadt (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 294 days.

(21) Appl. No.: 15/347,959

(22) Filed: Nov. 10, 2016

(65) Prior Publication Data
US 2017/0137129 A1     May 18, 2017

(30) Foreign Application Priority Data
Nov. 13, 2015  (EP) .................... 15194541

(51) Int. Cl.
| B64D 11/00 | (2006.01) |
| B64D 13/00 | (2006.01) |
| B64D 47/00 | (2006.01) |
| B64D 47/02 | (2006.01) |
| B64D 45/00 | (2006.01) |

(52) U.S. Cl.
CPC ............ *B64D 11/00* (2013.01); *B64D 13/00* (2013.01); *B64D 47/00* (2013.01); *B64D 47/02* (2013.01); *B64D 2011/0053* (2013.01); *B64D 2013/003* (2013.01); *B64D 2045/007* (2013.01); *B64D 2231/025* (2013.01); *Y02T 50/46* (2013.01)

(58) Field of Classification Search
CPC ............ B64D 11/00; B64D 11/0015; B64D 2011/0053; B64D 11/0046; B64D 2013/003864; B64D 11/0626; B64D 2011/0046; B64D 2011/0038; B64D 2013/003; B64D 2045/007; B64D 2231/025; B64D 13/00; B64D 47/00; B64D 47/02
See application file for complete search history.

(56) References Cited

U.S. PATENT DOCUMENTS 3,330,506 A * 7/1967 Robillard ............... B64D 11/00
                                                    244/118.5
5,707,028 A * 1/1998 Roeper ................... B64D 11/00
                                                    244/118.5
(Continued)

FOREIGN PATENT DOCUMENTS

| DE | 19926782 A1 | 12/2000 |
| EP | 2883793 A2 | 6/2015 |
| WO | 2006032082 A2 | 3/2006 |

OTHER PUBLICATIONS

European Search Report for Application No. 15194541.7-1754 dated Mar. 11, 2016, 7 Pages.

*Primary Examiner* — Richard R. Green
*Assistant Examiner* — Steven J Shur
(74) *Attorney, Agent, or Firm* — Cantor Colburn LLP

(57) ABSTRACT

An overhead aircraft passenger service unit, which is configured to be placed above the passenger seats within an aircraft cabin, comprises at least one cavity for housing at least one oxygen mask and at least one removable cover, which at least partially covers an opening of the cavity. The removable cover houses and/or supports at least one functional component.

16 Claims, 5 Drawing Sheets

(56) References Cited

U.S. PATENT DOCUMENTS

| | | | | |
|---|---|---|---|---|
| 5,816,244 | A | * 10/1998 | Aulgur | B64D 11/00 |
| | | | | 128/206.27 |
| 6,454,209 | B1 | 9/2002 | Bock | |
| 2005/0194009 | A1 | 9/2005 | Fischer | |
| 2012/0230530 | A1 | * 9/2012 | Schevardo | B64D 11/00 |
| | | | | 381/333 |
| 2012/0292986 | A1 | 11/2012 | Riedel | |
| 2013/0039020 | A1 | 2/2013 | Rittner | |
| 2013/0074836 | A1 | * 3/2013 | Contino | A62B 18/08 |
| | | | | 128/202.26 |
| 2014/0306059 | A1 | * 10/2014 | Brown | B64D 13/00 |
| | | | | 244/118.5 |
| 2015/0090839 | A1 | * 4/2015 | Freund | B64D 11/0015 |
| | | | | 244/118.5 |

* cited by examiner

AIRCRAFT OVERHEAD PASSENGER SERVICE UNIT

FOREIGN PRIORITY

This application claims priority to European Patent Application No. 15 194 541.7 filed Nov. 13, 2015, the entire contents of which is incorporated herein by reference.

TECHNICAL FIELD

The invention is related to an aircraft overhead passenger service unit, an in particular to an aircraft overhead passenger service unit which is configured for reducing the space needed when mounted at the ceiling of an aircraft cabin.

BACKGROUND

Passenger aircraft cabins usually are equipped with overhead passenger service units (PSUs), which comprise and/or support functional components such as reading lights, oxygen masks, gaspers, loudspeakers, optical signs, switches etc. Today's passenger service units cover a lot of space of the ceiling of an aircraft cabin and therefore do not allow for a dense arrangement of the passengers' seats which are arranged below overhead passenger service units.

It therefore would be beneficial to provide an improved overhead passenger service unit which needs less space than a conventional overhead passenger service unit while still providing at least the same functionalities.

SUMMARY

Exemplary embodiments of the invention include an overhead aircraft passenger service unit which is configured to be placed above the passenger seats within an aircraft cabin and which comprises at least one cavity for housing at least one oxygen mask and at least one removable cover. The at least one cavity comprises an opening facing the passenger's seats and the at least one removable cover is configured to at least partially cover said opening. The removable cover is further configured for housing and/or supporting at least one functional component of the overhead aircraft passenger service unit. The at least one functional component in particular may comprise at least one of a reading lamp, a gasper, a loudspeaker and a visual sign.

By integrating at least one functional component of the overhead aircraft passenger service unit into the at least one removable cover covering the at least one oxygen mask, the space needed for the overhead aircraft passenger service unit and in particular the area of the ceiling area above the passengers' seats, which is occupied by the overhead aircraft passenger service unit, is considerably reduced. This reduction allows for a denser arrangement of the passengers' seats provided below the overhead aircraft passenger service units. Such a denser seat configuration allows transporting more passengers within the same aircraft cabin and thus enhances the efficiency of operating the aircraft. As a smaller overhead aircraft passenger service unit is easier to handle than a larger overhead aircraft passenger service unit, it also facilitates changing the layout of the passengers' seats. This allows for a more flexible use of the aircraft by adjusting the layout of the cabin to different needs.

In an embodiment at least one reading lamp is supported and/or housed by the at least on removable cover. Additional components including at least one of a gasper, a loudspeaker and/or a visual sign are arranged in the overhead aircraft passenger service unit next to the at least one removable cover. Reading lamps, which usually are relatively light components, are well suited to be integrated into the removable cover.

In an embodiment, the removable cover houses and/or supports a plurality of reading lamps. In particular, the removable cover may house and/or support 2 or 3 reading lamps.

In an embodiment, the at least one functional component, which is supported by the at least one removable cover, is arranged on the side of the removable cover facing the passengers' seats when the overhead aircraft passenger service unit is installed above said seats. An oxygen mask is housed within the cavity, which is formed on the other, opposite side of the at least one removable cover facing away from the passengers' seats. In other words, the at least functional component is separated from the at least one oxygen mask by the removable cover. This configuration prevents any interference between the functional component and the removable cover.

In an embodiment, at least one supply line is provided within the at least one removable cover. Said supply line may include one or more electrical lines for providing electrical power to the functional component, e.g. a reading lamp, a loudspeaker and/or a visual sign. Said supply line may also include a signal line for providing a signal to the functional component, such as a dimming command for a reading lamp and/or an audio signal for the loudspeaker. The at least one removable cover also may comprise an air duct or air hose, for delivering air to a gasper, which is supported by the removable cover.

In an embodiment, the at least one removable cover is rotatably mounted to an axle extending basically horizontally, i.e. parallel to the floor of the aircraft cabin, when the overhead aircraft passenger service unit is arranged in its normal operational position above the passengers' seats. The axle in particular may extend in a longitudinal direction of the aircraft cabin. In alternative embodiments, the axle may extend orthogonally to the longitudinal direction or diagonally, i.e. at an angle between 0° and 90° with respect to the longitudinal direction, while still extending in a horizontal plane.

In an embodiment, an area on a first side of the at least one removable cover is rotatably fixed to the basically horizontally extending axle, while a second area located at another, opposing side of the at least one removable cover is removably fixed to a fixture of the overhead aircraft passenger service unit. For providing access to the at least one oxygen mask, the second area at the opposing side of the removable cover is released so that this side will drop down while the removable cover pivots around the basically horizontally extending axle. As a result, the removable cover will dangle from the axle allowing the at least one oxygen mask to drop out of the cavity. Such a structure provides a very simple, reliable and fast mechanism for opening the at least one removable cover in an emergency situation.

In an embodiment, the at least one removable cover is rotatable around an axle which extends basically vertically, i.e. orthogonally to the floor of the aircraft cabin when the overhead aircraft passenger service unit is arranged in its normal operating position above the passengers' seats. The at least one removable cover in particular may be allowed not only to rotate about the basically vertically extending axle, but also to slide along the length of said axle, i.e. in an basically vertical direction.

In an embodiment, an area of the at least one removable cover, which is spaced apart from the axle, is fixed to a fixture of the overhead aircraft passenger service unit. For providing access to the at least one oxygen mask, the area fixed to the fixture is released. As a result, the removable cover drops down by moving linearly along the length of the axle. There may be provided an elastic element, i.e. a spiral spring, which is configured to cause the removable cover to rotate around the basically vertically extending axle after it has moved down along the length of the axle. With said rotational movement the removable cover moves away from the opening of the cavity providing access to the at least one oxygen mask housed within the cavity. The oxygen mask will drop out of the cavity and may be grasped and used by the passenger(s) sitting below the overhead aircraft passenger service unit. In such a configuration, the at least one removable cover does not hang down from the ceiling in its open position, and thus the risk that the at least one removable cover will collide with a passenger's head is very low.

In an embodiment, the overhead aircraft passenger service unit comprises a plurality of cavities, and each of the cavities is configured for housing a single oxygen mask. Thus, a plurality of oxygen masks is provided for a plurality of passengers sitting in a plurality of seats provided under the overhead aircraft passenger service unit. Housing each oxygen mask in a separate cavity prevents the oxygen masks from blocking each other. It further reduces the risk that the flexible hoses connecting each of the oxygen masks with a corresponding oxygen source get tangled up, which might prevent the oxygen masks from falling out of the cavity or degrade their functionality.

In an embodiment, a single removable cover covers a plurality of cavities. Providing only a single removable cover for a plurality of cavities simplifies the structure of the overhead aircraft passenger service unit, in particular only a single opening and locking mechanism need to be provided, respectively. This enhances the operational reliability and reduces the costs of the overhead aircraft passenger service unit.

In an embodiment, the overhead aircraft passenger service unit comprises a plurality of removable covers and each of the plurality of removable covers is configured for covering a single cavity. In case each of the removable covers is configured for covering only a single cavity, respectively, each removable cover may be smaller than a removable cover which is configured for covering a plurality of adjacent cavities. By providing a smaller removable cover the risk of hitting a passenger's head is reduced. Additionally, the weight of a smaller removable cover usually is less than the weight of a bigger removable cover. In consequence, even in case a removable cover hits a passenger's head, the risk of causing an injury is low. Additionally, in case of the removable cover having less weight, the axle and the lock need to be configured for carrying less weight, as well. They therefore may be produced at lower costs.

In an embodiment, each of the plurality of removable covers supports one of the functional components. In an alternative embodiment, each or at least some of the plurality of removable covers supports two or more functional components. This allows adjusting the layout of the overhead aircraft passenger service unit flexibly to the actual needs.

In an embodiment, the overhead aircraft passenger service unit comprises a single cavity, which is configured for housing a plurality of oxygen masks. An overhead aircraft passenger service unit comprising a single cavity has a simple structure, which may be produced easily at low costs.

In an embodiment, the overhead aircraft passenger service unit comprises a single removable cover completely covering the single cavity. Providing only a single removable cover, which covers the single cavity completely, simplifies the structure of the overhead aircraft passenger service unit. In particular, only a single mechanism for opening and a single mechanism for locking the cover need to be provided. This enhances the operational reliability and reduces the costs of the overhead aircraft passenger service unit.

In an embodiment, the overhead aircraft passenger service unit comprises a plurality of removable covers, wherein each of the plurality of removable covers covers a portion of the single cavity. In case a plurality of removable covers respectively covering only a portion of the cavity is provided, each removable cover may be smaller than a removable cover which is configured for covering the cavity completely. With a smaller removable cover the risk of hitting a passenger's head is reduced. Additionally, the weight of a smaller removable cover usually is less than the weight of a bigger removable cover, and thus, even in case of hitting a passenger's head, the risk of causing an injury is low. Additionally, in case of a lighter removable cover, the axle and the lock need to be configured for carrying less weight, as well. They therefore may be produce at lower costs.

In an embodiment, the plurality of removable covers, in combination, cover the opening of the cavity completely.

In an embodiment, the at least one removable cover basically extends in a first plane and the overhead aircraft passenger service unit further comprises at least one loudspeaker extending in a second plane, wherein the second plane is inclined with respect to the first plane. When the plane of the loudspeaker is pivoted out of the plane of the overhead aircraft passenger service unit, only the projection of the loudspeaker onto the plane of the overhead aircraft passenger service unit contributes to the area of the passenger aircraft cabin ceiling, which is occupied by the components of the overhead aircraft passenger service unit, and thus said area is reduced even further.

In an embodiment, the second plane of the loudspeaker is oriented with respect to the first plane of the at least one removable cover in an angle between 45° and 90°. Orienting the plane of the loudspeaker in such an angle considerably reduces the area of the passenger aircraft cabin ceiling occupied by the loudspeaker.

In an embodiment, at least one visual sign is positioned below the loudspeaker, i.e. on the side of the loudspeaker facing the passengers' seats when the overhead aircraft passenger service unit in installed in its normal operational position within the aircraft passenger cabin.

In an embodiment, the visual sign comprises a display panel, which may be illuminated by a corresponding light source. The display panel extends in a third plane, which is inclined with respect to the first plane and/or the second plane. The third plane in particular is oriented so that symbols, which are formed on the display panel and which may be illuminated by the appropriate light source from the back, i.e. from a side of the display panel which is opposite to the passengers, are easily recognizable by said passengers and/or by cabin service personnel.

BRIEF DESCRIPTION OF THE DRAWINGS

Exemplary embodiments of the invention are described in greater detail below with reference to the enclosed figures.

DETAILED DESCRIPTION

Figure 1A:
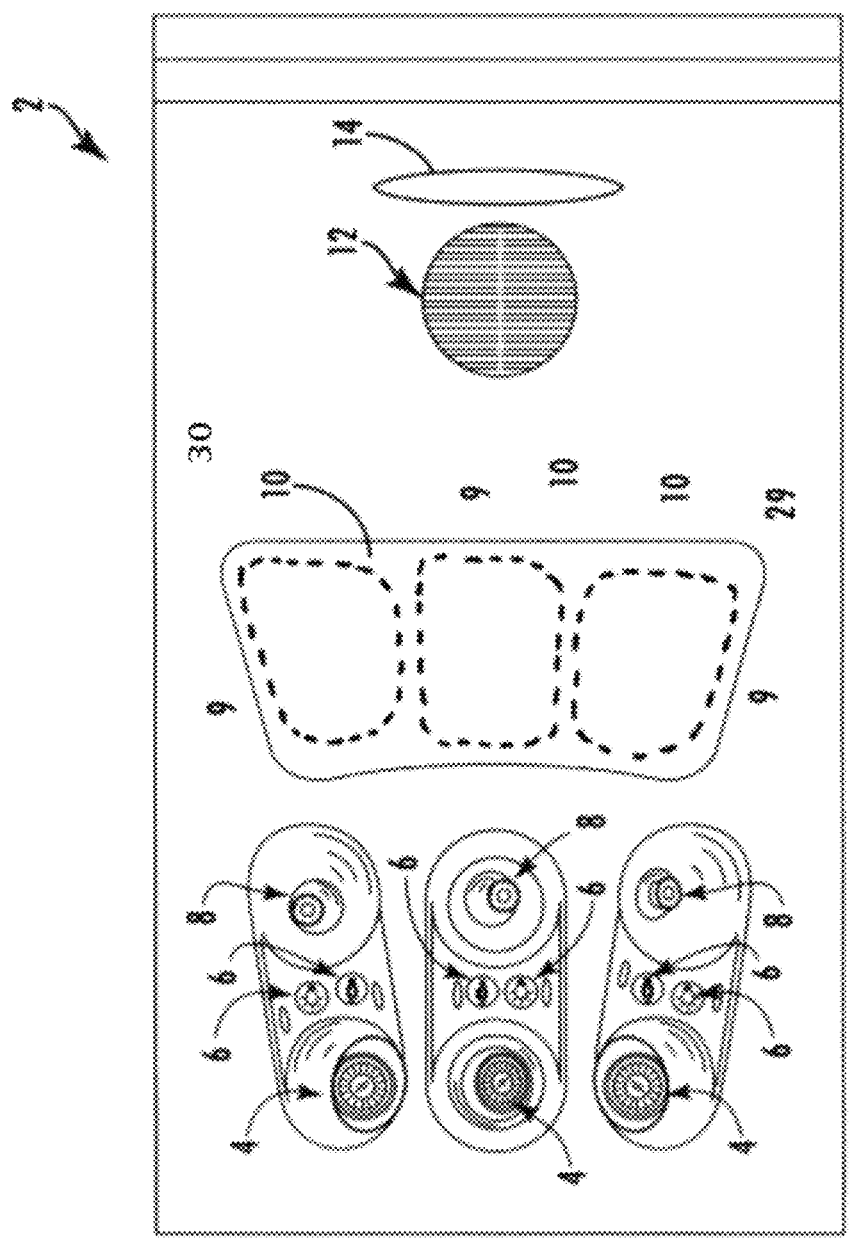
FIG. 1A depicts a schematic view of an alternative overhead passenger service unit as it is seen from the side of passengers sitting below the overhead passenger service unit.
Figure 1:
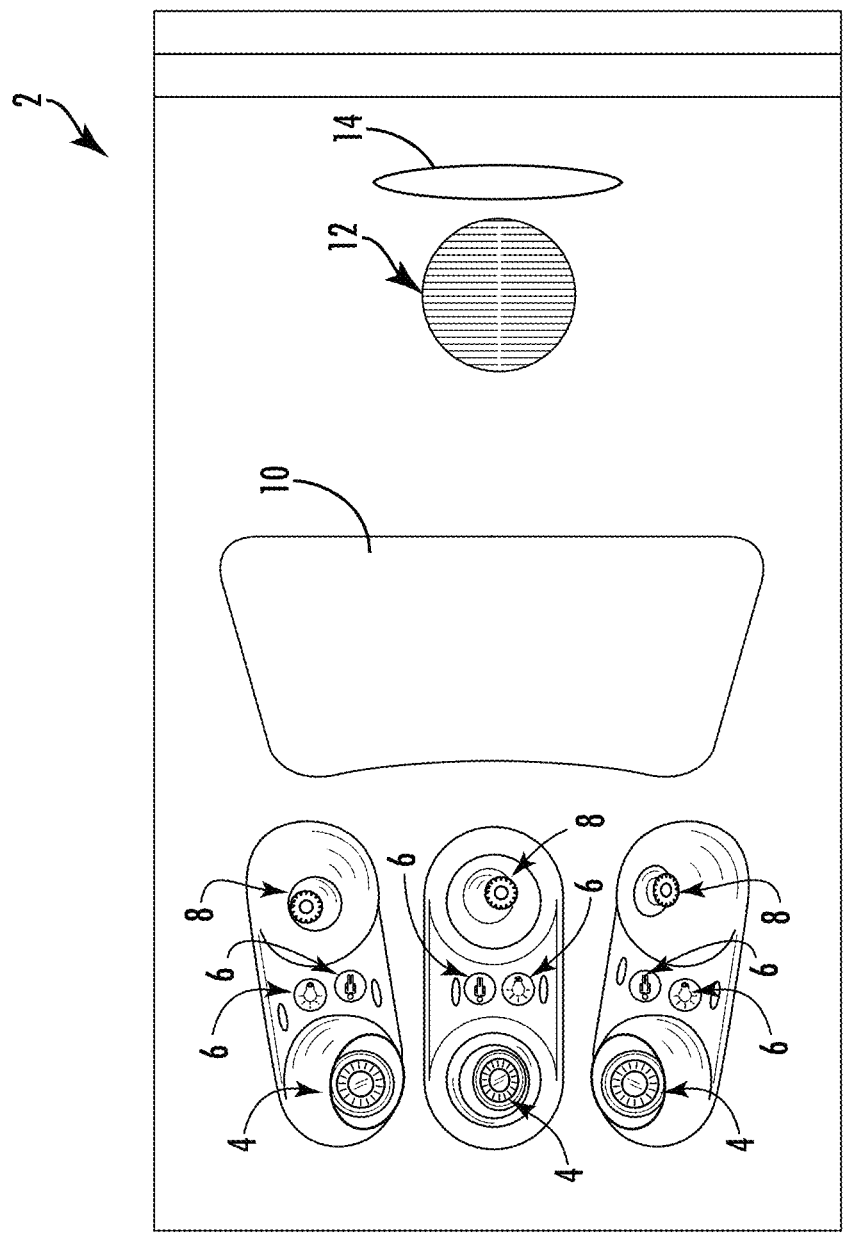
FIG. 1 shows a schematic view of a conventional overhead passenger service unit as it is seen from the passengers.

FIG. 1 depicts a schematic view of a conventional overhead passenger service unit 2 as it is seen from the side of passengers sitting below the overhead passenger service unit 2.

On the side, which is shown to the left in FIG. 1, the overhead passenger service unit 2 comprises a row of three adjustable reading lights 4 arranged next to each other in a lateral direction.

Six electrical switches 6 are provided to the right side of the reading lights 4, a pair of two switches 6 next to each of the reading lights 4, respectively. One of the switches 6 of each pair may be configured for switching the adjacent reading light 4, while the second switch of each pair may be configured for triggering a signal for calling cabin service personnel.

A row of three adjacent gaspers 8 arranged in the lateral direction is provided next to the switches 6. The gaspers 8 are individually pivotable, allowing the passengers to adjust the air stream provided by the gaspers 8 according to the passengers' individual needs.

Next to the gaspers 8, there is a removable cover 10, which covers a cavity housing at least three oxygen masks (not shown). In the event of pressure loss within the cabin, the removable cover 10 will open, the oxygen masks will drop out of the cavity and each of the passengers sitting below the overhead passenger service unit 2 may grasp one of the oxygen masks. The oxygen masks will be supplied with oxygen allowing the passengers to continue to breathe normally.

On the side opposite to the gaspers 8, a grid 12 is formed within overhead passenger service unit 2. A loudspeaker (not shown), which may be used for delivering acoustic announcements to the passengers, is arranged behind said grid 12.

Next to the grid 12, there is a display panel 15 comprising a plurality of visual signs (not shown), such as "non smoking" or "fasten you seat belt", which may be illuminated from behind in order to deliver visual information to the passengers sitting below the overhead passenger service unit 2.

FIG. 1A depicts a schematic view of an alternative overhead passenger service unit 2 as it is seen from the side of passengers sitting below the overhead passenger service unit 2. The overhead aircraft passenger service unit 2 comprises a plurality 29 of cavities 9, each of the cavities 9 being configured for housing a single oxygen masks (not shown) and covered by removable cover 10 from a plurality 30 of removable covers 10. In FIG. 1A, the peripheries of the cavities 9 are drawn as dashed lines as the cavities 9 are covered by the removable covers 10.

Figure 2:
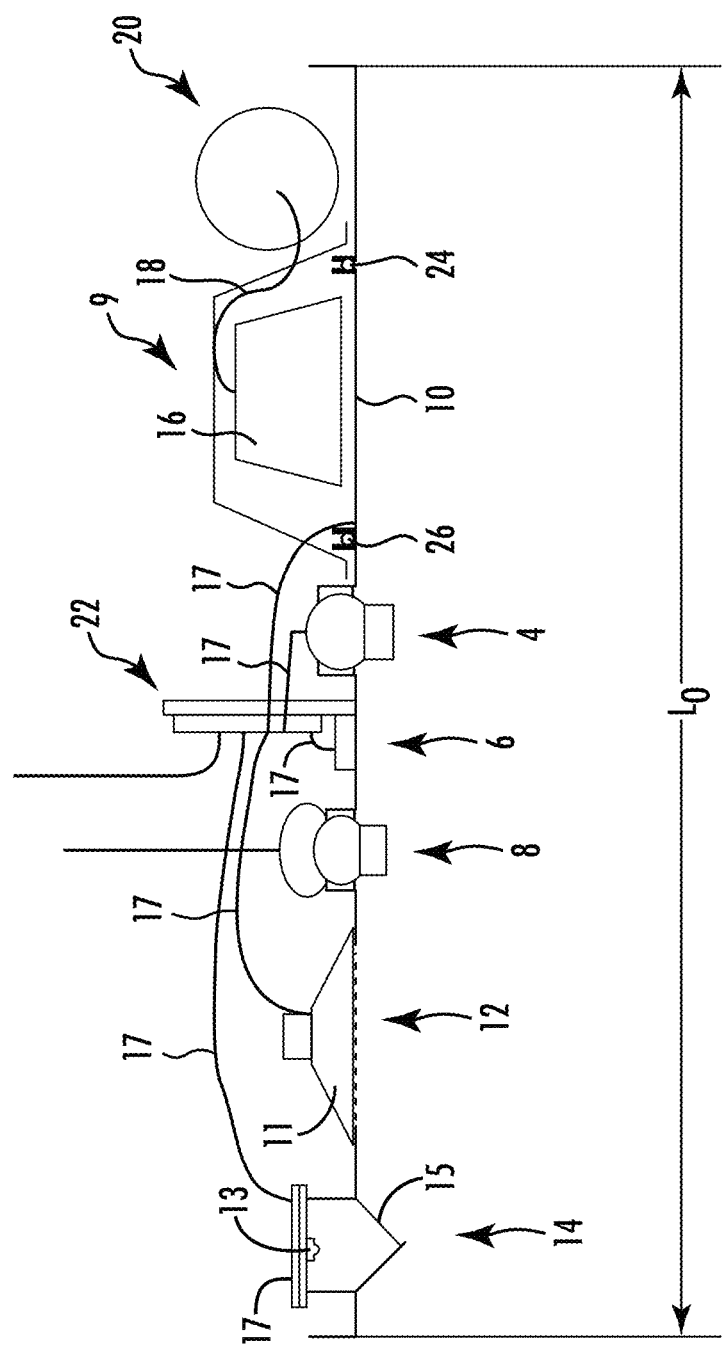
FIG. 2 shows a schematic sectional view through a conventional overhead passenger service unit.

FIG. 2 shows a schematic sectional view of a conventional overhead passenger service unit 2. The order in which the functional components 4, 6, 8, 12, 14 are arranged is slightly different from the order depicted in FIG. 1, but their functionality is respectively the same. In particular, in the configuration shown in FIG. 2, the cavity 9 housing the oxygen mask 15 is arranged not in between the gaspers 8 and the loudspeaker 11, but the gaspers 8, the switches 6 and the reading lights 4 are arranged between the loudspeaker 11 and the cavity 9 housing the oxygen mask 15.

FIG. 2 further depicts an oxygen reservoir 20, e.g. an oxygen candle fluidly connected to the oxygen mask 16 by means of a flexible hose 18 for delivering oxygen to the oxygen mask 16 in case of a loss of air pressure within the cabin.

An electric (printed) circuit board (PCB) 22 is arranged next to the switches 6. The electric circuit board 22 is electrically connected to the electrical components of the overhead passenger service unit 2, i.e. the loudspeaker 11, the reading lights 4, the switches 6 and a light source 13 of the visual sign 14, which is supported by a support structure 19, by means of a plurality of electric wires 17.

An axle 26 is provided at a first side of the removable cover 10. The axle 26 extends in the horizontal direction, perpendicular to the plane of view of FIG. 2. The removable cover 10 is configured to pivot around said axle 26 for opening the bottom of the cavity 9. This will allow the oxygen mask(s), which are stored within the cavity 9, to fall out of the cavity 9.

A switchable locking mechanism 24 preventing the removable cover 10 to pivot around the axle 26 in its normal, locked state is provided at a second side of the removable cover 10, which is opposite to the axle 26. In the event of pressure loss within the cabin, the locking mechanism 24 will open allowing the removable cover 10 to pivot around the axle 26, providing access to the cavity 9 and releasing the oxygen mask(s) 16 stored within the cavity 9.

Arranging the different functional components 4, 6, 8, 12, 14 of the overhead passenger service unit 2 side by side next to each other, as it is illustrated in FIGS. 1 and 2, results in a relatively large width L0 of the overhead passenger service unit 2, which prevents a dense arrangement of the passengers' seats within the cabin.

Figure 3:
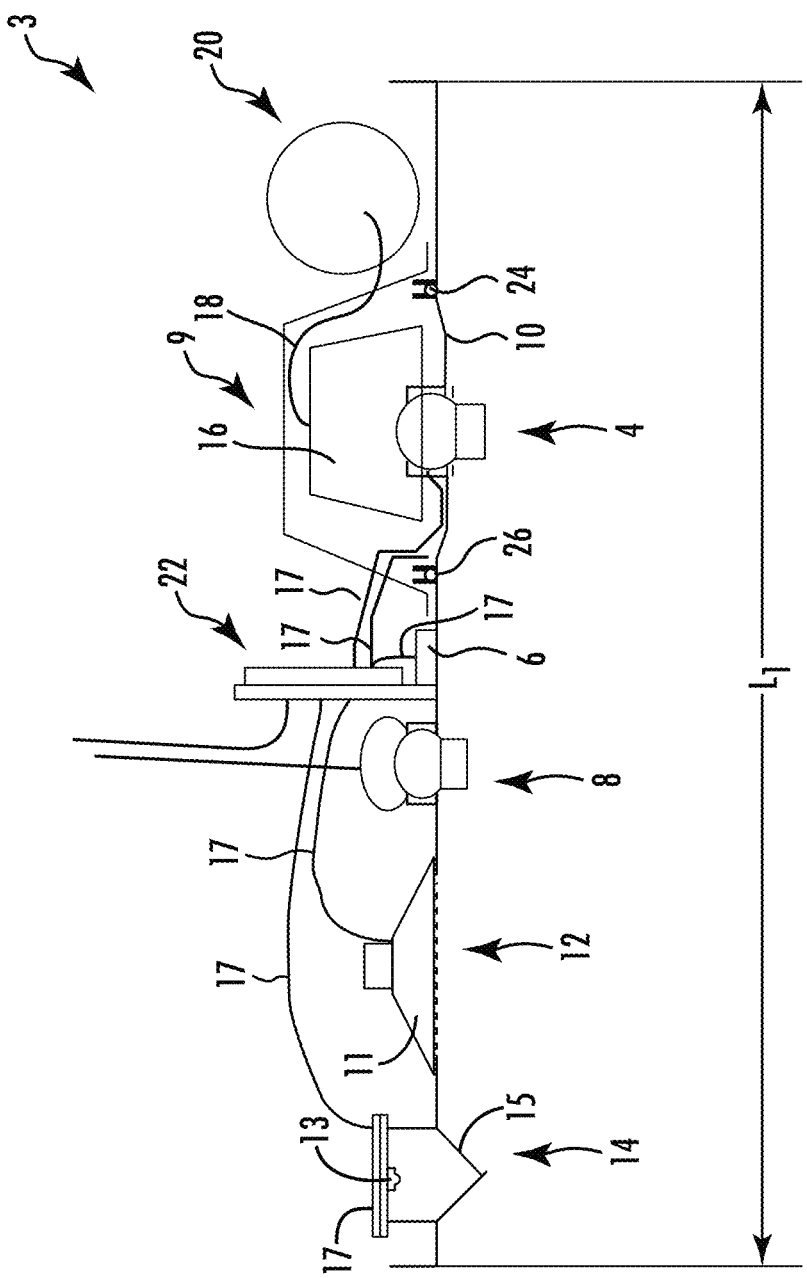
FIG. 3 depicts a schematic sectional view through an overhead passenger service unit according to an exemplary embodiment of the invention.

FIG. 3 depicts a schematic sectional view through an overhead passenger service unit 2 according to an embodiment of the invention.

The individual functional components 4, 6, 8, 12, 14 are basically identical to the functional components 4, 6, 8, 12, 14 shown in FIG. 2 and the features, which remain unchanged, are not described in detail again.

In the embodiment shown in FIG. 3, the reading light 4, however, is not mounted next to the cavity 9 housing the oxygen mask 16, but within the removable cover 10. The reading light 4 in particular is provided on the outside of the removable cover 10 facing the passenger's seats (not shown), i.e. at the bottom of the removable cover 10 when the overhead passenger service unit 2 is mounted in its normal operational position above the passengers' seats.

Although in the embodiment shown in FIG. 3 only a reading light 4 is supported by the removable cover 10, the skilled person easily understands that additionally or alternatively other functional components 6, 8, 12, 14, i.e. visual signs 14, a loudspeaker 11, gaspers 8 and/or switches 6 may be supported by or integrated with the removable cover 10, as well. Moreover, as FIG. 3 only shows a cross-sectional view, the skilled person also understands that one or more additional reading lights may be supported by the removable cover 10, in front of and/or behind the drawing plane of FIG. 3.

Arranging at least one of the functional components 4, 6, 8, 12, 14 within the removable cover 10 reduces the width L1 of the overhead passenger service unit 2 considerably. As a result, the seats (not shown) provided below the overhead passenger service unit 2 may be arranged in a denser configuration which allows more passengers to be seated within the aircraft cabin.

Figure 4:
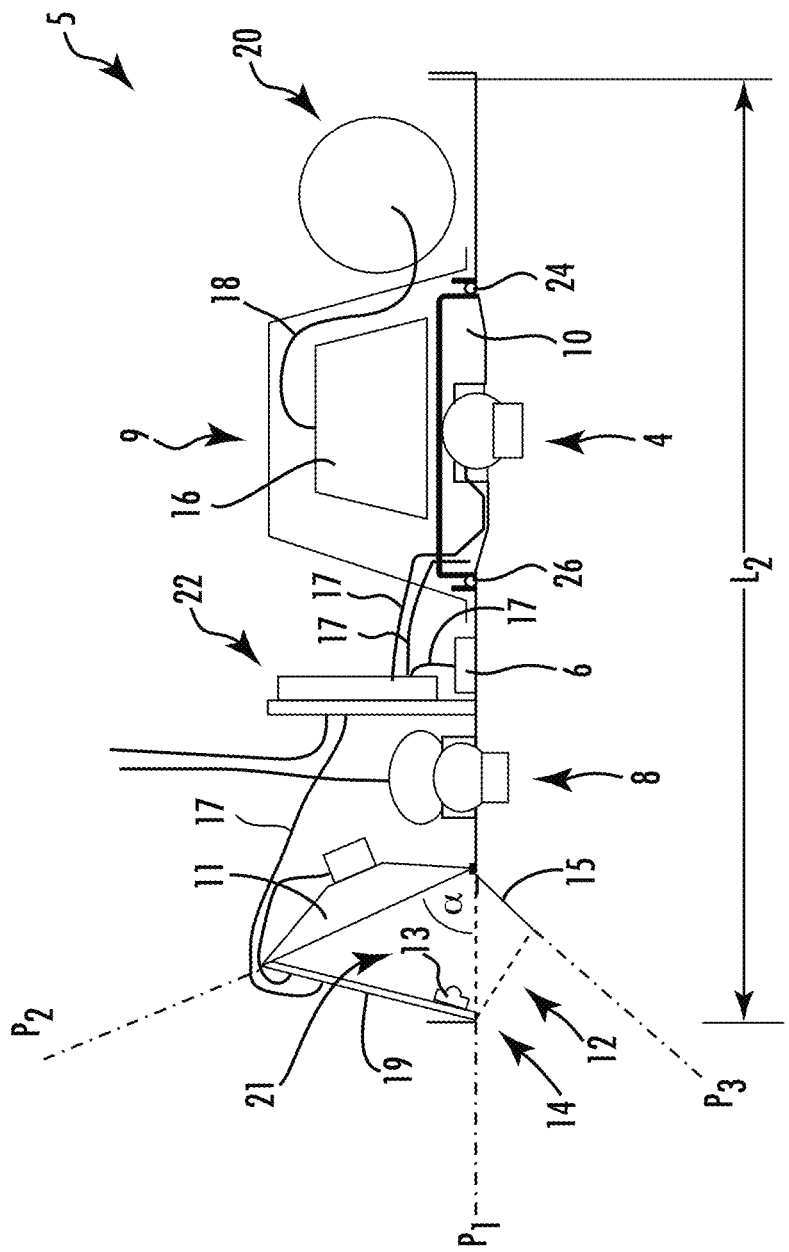
FIG. 4 depicts a schematic sectional view through an overhead passenger service unit according to another exemplary embodiment of the invention.

FIG. 4 depicts a schematic sectional view through an overhead passenger service unit 3 according to another exemplary embodiment of the invention.

The functional components 4, 6, 8, 12, 14, which are identical to the functional components 4, 6, 8, 12, 14 shown in FIG. 3, will not be described in detail again.

The embodiment shown in FIG. 4 differs from the embodiment shown in FIG. 3 in that the front plane P2 of the loudspeaker 11 (second plane) is not oriented parallel to the plane P1 of the overhead passenger service unit 2 (first plane), which is horizontal in the arrangement shown in FIGS. 3 and 4. Instead, the front plane P2 of the loudspeaker 11 is oriented at an angle α with respect to the plane P1 of the overhead passenger service unit 2. Said angle α in particular may be between 45° and 90°.

In the embodiment shown in FIG. 4, the loudspeaker 11 is arranged in close combination with the visual sign 14. The loudspeaker 11 in particular is arranged above the display panel 15 of the visual sign 14, forming a hollow space 21 defined by the loudspeaker 11, the display panel 15, the grid 12 and the support structure 19 of the light source 13. The display panel 15 extends in a third plane P3, which is inclined with respect to the (first) plane P1 of the overhead passenger service unit 2 and/or the (second) plane P2 of the loudspeaker 11.

Such a structure results in a very compact overhead passenger service unit 2, allowing to reduce the width L2 of the overhead passenger service unit 2 even further (L2<L1).

As a result, an overhead passenger service unit 2 according to the exemplary embodiment shown in FIG. 4 has a very short width L2 which allows a very dense arrangement of the passengers' seats below the overhead passenger service unit 2.

Due to its reduced dimensions, the overhead passenger service unit 2 is easy to handle. This facilitates the installation and replacement of the overhead passenger service unit 2 allowing a more flexible use of the aircraft by shifting and/or replacing the overhead passenger service units 2 installed within the cabin.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the following claims.

The invention claimed is:

1. An overhead aircraft passenger service unit, which is configured to be placed above passenger seats within an aircraft cabin and which comprises:
   a stationary portion comprising at least one cavity for housing at least one oxygen mask; and
   at least one moveable cover, which, in an emergency situation including a pressure loss within the aircraft cabin, is movable with respect to the stationary portion from a closed position into at least one open position by rotating around an axle, wherein the at least one movable cover, when arranged in the closed position, at least partially covers an opening of the at least one cavity, and wherein the at least one movable cover, when arranged in the at least one open position, allows the at least one oxygen mask to drop out of the at least one cavity;
   wherein the at least one moveable cover houses and/or supports at least one first functional component, and the at least one first functional component includes at least one of: a reading lamp, a gasper, and a loudspeaker; and
   wherein the stationary portion houses and/or supports at least one second functional component, including at least one of a visual sign, the reading lamp, the gasper, and the loudspeaker, positioned outside the at least one movable cover.

2. The overhead aircraft passenger service unit of claim 1, wherein the at least one first functional component further includes the visual sign.

3. The overhead aircraft passenger service unit of claim 1, wherein the at least one first functional component includes the reading lamp.

4. The overhead aircraft passenger service unit of claim 1, wherein the at least one moveable cover houses and/or supports a plurality of reading lamps.

5. The overhead aircraft passenger service unit of claim 1, wherein the axle extends in a horizontal plane.

6. The overhead aircraft passenger service unit of claim 1, wherein the at least one cavity comprises a plurality of cavities, each of the plurality of cavities being configured for housing a single oxygen mask.

7. The overhead aircraft passenger service unit of claim 6, comprising a single moveable cover which is configured for covering the plurality of cavities.

8. The overhead aircraft passenger service unit of claim 6, wherein the at least one moveable cover comprises a plurality of moveable covers, each of the plurality of moveable covers being configured for covering a single one of the plurality of cavities.

9. The overhead aircraft passenger service unit of claim 1 comprising a single cavity, which is configured for housing a plurality of the at least one oxygen mask.

10. The overhead aircraft passenger service unit of claim 9, comprising a single moveable cover that is configured for completely covering the cavity, and
    wherein the at least one moveble cover comprises a plurality of moveable covers, each of the plurality of movable covers being configured for covering a portion of the single cavity.

11. The overhead aircraft passenger service unit of claim 9, wherein the at least one moveable cover comprises a plurality of moveable covers, each of the plurality of moveable covers being configured for covering a portion of the single cavity, wherein the plurality of moveable covers, in combination, cover the whole opening of the single cavity.

12. The overhead aircraft passenger service unit of claim 1, wherein the at least one moveable cover, when arranged in the closed position, extends in a first plane ($P_1$) and the overhead aircraft passenger service unit further comprises at least one loudspeaker extending in a second plane ($P_2$), wherein the second plane ($P_2$) is inclined with respect to the first plane ($P_1$).

13. The overhead aircraft passenger service unit of claim 11, wherein at least one visual sign is positioned on a side of the at least one loudspeaker facing at least one passenger when the overhead aircraft passenger service unit is installed in its normal operational position.

14. The overhead aircraft passenger service unit of claim 13, wherein the at least one movable cover, when arranged in the closed position, extends in a first plane ($P_1$) and the at least one loudspeaker extends in a second plane ($P_2$), wherein the second plane ($P_2$) is inclined with respect to the first plane ($P_1$), and wherein the visual sign comprises a display panel extending in a third plane ($P_3$), which is inclined with respect to the first plane ($P_1$) and/or the second plane ($P_2$).

15. The overhead aircraft passenger service unit of claim 4, wherein the at least one movable cover houses and/or supports of the two or three reading lamps.

16. The overhead aircraft passenger service unit of claim 12, wherein the second plane ($P_2$) is oriented with respect to the first plane ($P_1$) at an angle ($\alpha$) between 45° and 90°.

* * * * *